(12) United States Patent
Schwartz

(10) Patent No.: US 11,568,873 B2
(45) Date of Patent: Jan. 31, 2023

(54) PRIVACY ENHANCEMENT APPARATUSES FOR USE WITH VOICE-ACTIVATED DEVICES AND ASSISTANTS

(71) Applicant: Bernard J. Schwartz, Los Angeles, CA (US)

(72) Inventor: Bernard J. Schwartz, Los Angeles, CA (US)

(73) Assignee: Bernard J. Schwartz, Los Angeles, CA (US)

( * ) Notice: Subject to any disclaimer, the term of this patent is extended or adjusted under 35 U.S.C. 154(b) by 387 days.

(21) Appl. No.: 16/850,452

(22) Filed: Apr. 16, 2020

(65) Prior Publication Data

US 2021/0327432 A1    Oct. 21, 2021

(51) Int. Cl.
| | |
|---|---|
| *G10L 15/28* | (2013.01) |
| *G10L 15/22* | (2006.01) |
| *G10L 21/06* | (2013.01) |
| *G10L 15/26* | (2006.01) |
| *H04R 1/02* | (2006.01) |
| *G06F 3/16* | (2006.01) |
| *G10K 11/175* | (2006.01) |
| *G10L 17/24* | (2013.01) |

(52) U.S. Cl.
CPC .............. *G10L 15/28* (2013.01); *G06F 3/167* (2013.01); *G10L 15/22* (2013.01); *G10L 15/26* (2013.01); *G10L 17/24* (2013.01); *G10L 21/06* (2013.01); *H04R 1/025* (2013.01); *G10K 11/1754* (2020.05); *H04R 2499/11* (2013.01)

(58) Field of Classification Search
CPC ......... G10L 15/28; G10L 15/22; G10L 15/26; G10L 17/24; G10L 21/06; G06F 3/167; H04R 1/025; H04R 2499/11; G10K 11/1754
USPC .......................................................... 381/87
See application file for complete search history.

(56) References Cited

U.S. PATENT DOCUMENTS

| | | | |
|---|---|---|---|
| 10,453,460 B1 * | 10/2019 | Wightman | .............. G10L 15/26 |
| 2013/0054246 A1 | 2/2013 | Newman | |
| 2020/0110443 A1 * | 4/2020 | Leong | ...................... H04N 7/14 |

(Continued)

OTHER PUBLICATIONS

International Search Report and the Written Opinion issued for corresponding application No. PCT/US2021/027532, Int'l Filing Date Apr. 15, 2021, dated Jul. 21, 2021, 13 pages.

(Continued)

*Primary Examiner* — Paul Kim
(74) *Attorney, Agent, or Firm* — ArentFox Schiff LLP

(57) ABSTRACT

Devices for preventing unintended conversation from being recorded by a voice activated assistant device/application (VAD) are disclosed. The device is contoured to fit over a functional surface of a VAD that typically includes a plurality of microphones and control buttons. The device covers the microphones and uses its own microphones to monitor for an authorization input signal. In an embodiment, the devices uses speakers aligned with and opposing each VAD microphone. The device emits interfering audible signals during this mode of operation. Once the device senses an authorization input, the device decouples its speakers from the interfering audible signal and instead allows the device microphones to pass through to the VAD. During this mode, the VAD is in normal operation.

18 Claims, 11 Drawing Sheets

(56) References Cited

U.S. PATENT DOCUMENTS

2021/0026487 A1  1/2021  Wodrich et al.

OTHER PUBLICATIONS

Bjorn Karmann, "Project Alias", 2018; URL <https://bjoernkarmann.dk/project_alias>.
Smart Mute by Mysmarterlife.com; courtesy of GoDaddy.com; Copyright © 1999-2020 GoDaddy, LLC., All rights reserved. Mute, Smartē and pluggits are trademarks of Tosech, LLC; © 2018 Tosech, LLC, All Rights Reserved; URL <https://mysmartelife.com/products/muteplus>.

* cited by examiner

PRIVACY ENHANCEMENT APPARATUSES FOR USE WITH VOICE-ACTIVATED DEVICES AND ASSISTANTS

BACKGROUND

Field

The present disclosure relates generally to voice-activated assistant devices and applications (collectively VADs), and specifically to techniques for preventing voice and other audible information from being acquired or recorded by the VADs.

Background

VADs are "always on" electronic devices or processor-based virtual assistant applications that provide various services or informational responses based on verbal inquiries from a user. The VAD continuously monitors audible information and relies upon application of a "wake" word or phrase (or the depression of an input button) to begin active listening to a user in anticipation of providing information or performing a requested function. The features of the VADs include, for example, providing responses to user questions about basic facts (such as providing weather, directions or traffic information), providing audio or music playback, switching appropriately configured lights on and off, memorizing recipes and setting requested calendar events, creating user to-do lists, setting alarms, changing channels, and playing audiobooks, among numerous other applications. When performing specific actions in response to user requests (as opposed to merely providing information), VADs can be configured to control different types of so-called "smart" devices that include software compatibility with a VAD, such as certain stereos, televisions, alarms, light bulbs, thermostat controllers, sprinklers and other basic appliances.

VADs have become prolific in recent years. Various major electronics/computer manufacturers and e-commerce giants have rapidly introduced into the market new models with increasing capabilities and features. Some are compact and portable; others are larger and more sophisticated. However, all VADs generally purport to rely on the use of a user prompt, such as a voice prompt to "enable" the device, after which the VAD can be verbally prompted to provide information (e.g., by using various designated sources from the world wide web, to which the VAD is constantly networked) or to perform certain basic actions such as those enumerated above.

Additionally, VADs can exist in software running on a processing system of a mobile device, PC, server, and the like. Voice assistants are now standard on most or all commercial cellular telephones, enabling users to inquire into facts, to dictate text, to call or text message a particular person, and generally to perform an array of functions. For the purposes of this disclosure, VADs also refer to these processor-based applications. Such VADs also are present on most PCs, and come standard with most operating systems.

VADs and other devices such as smart phones have arguably increased the efficiency of performing basic functions in a home for users that set up networks of smart devices. According to VAD providers, VADs have made it easier to acquire information relevant to the daily activities of most people, and have brought humans into a new age where formerly manual devices can now become automated.

With the advent of VADs have become increasing privacy concerns.

SUMMARY

Several aspects of the present disclosure will be described more fully hereinafter with reference to various aspects of the present disclosure.

In one aspect of the disclosure, an apparatus for preventing unintended audible information from passing to a voice-activated assistant device (VAD), including a housing configured to form a seal around at least a region including one or more VAD microphones while allowing user access to VAD controls, at least one microphone arranged at an exterior surface of the housing, one or more speakers arranged at an interior surface of the housing and positioned to align with and oppose the respective one or more VAD microphones, and a processing system in the housing that operates in a first mode in which the one or more speakers outputs an auditory signal configured to interfere with voice content sourced proximate the VAD, and, upon receiving a designated authorization input via the at least one microphone, that operates in a second mode permitting the voice content to pass via the one or more speakers to the VAD.

In another aspect of the disclosure, an apparatus for controlling a voice-activated assistant device (VAD) includes a housing including an upper member configured to fit over the VAD to form at least a partially acoustically sealed region, the housing comprising one or more internal speakers configured to align with and oppose one or more corresponding VAD microphones in the region, and a processing system that outputs, in a jamming mode, an acoustic jamming signal from the one or more internal speakers into the respective one or more VAD microphones to thereby block interpretation by the VAD of external acoustic content.

In still another aspect of the disclosure, an apparatus for controlling a voice activated assistant (VAD) on a mobile device includes a housing, one or more speakers in the housing that align with and oppose one or more respective microphones of the mobile device, at least one microphone at an external surface of the housing, and a processing system that operates in a first mode by continuously passing a jamming audible signal from the one or more speakers to the corresponding one or more microphones, and that operates, upon receiving an authorization input via the at least one microphone, in a second mode in which all acoustic input is passed via the one or more speakers to the at least one microphone of the mobile device.

It will be understood that other aspects of preserving privacy while using VADs will become readily apparent to those skilled in the art from the following detailed description, wherein it is shown and described only several embodiments by way of illustration. As will be realized by those skilled in the art, the disclosed subject matter is capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various exemplary embodiments of the "Talk-Lock" apparatuses of the present disclosure will now be presented in the detailed description by way of example, and not by way of limitation, in the accompanying drawings, wherein.

DETAILED DESCRIPTION

Figure 1:
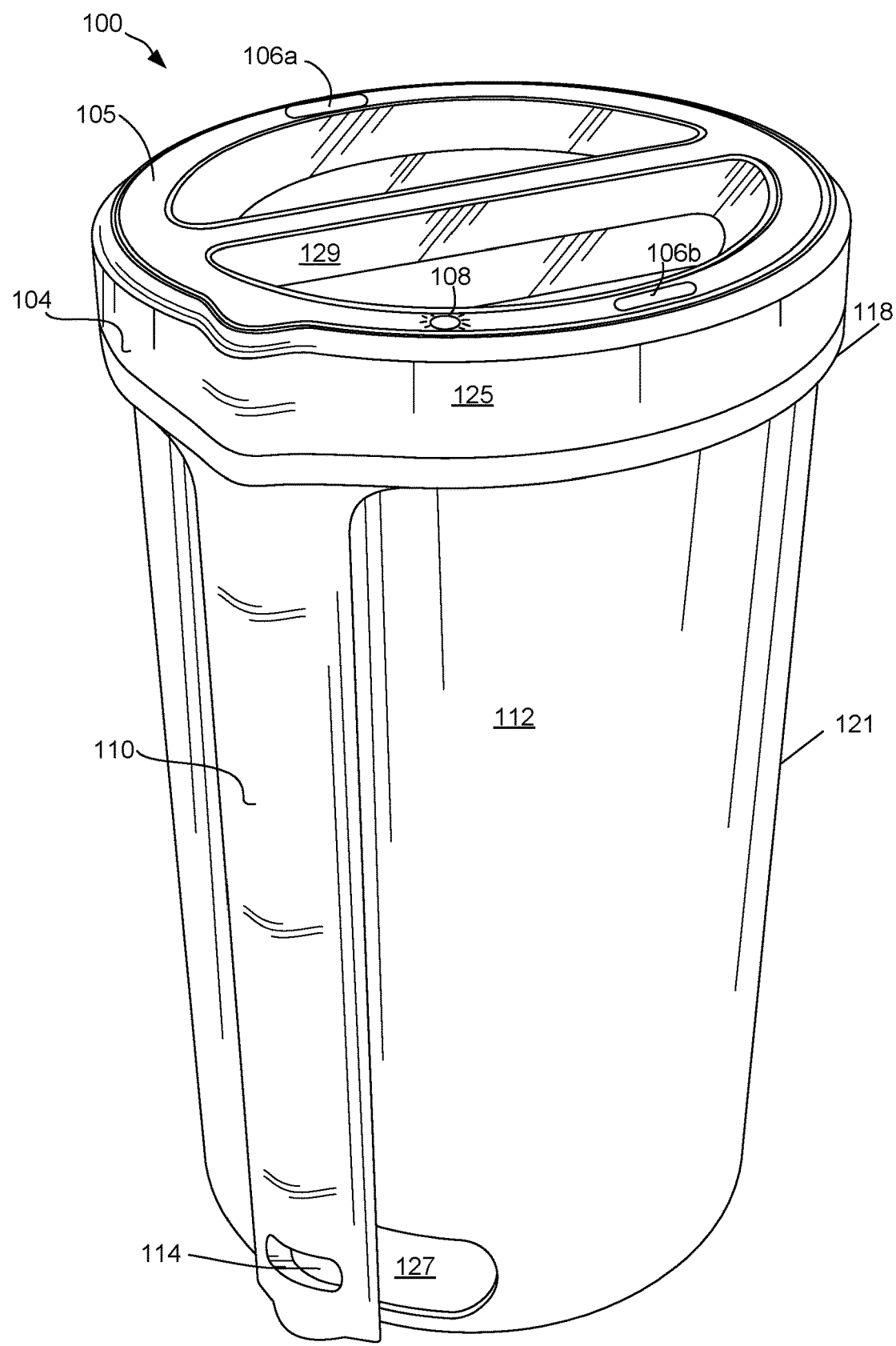
FIG. 1 is a perspective view of a Talk-Lock device coupled to a conventional VAD in accordance with an embodiment.

The detailed description set forth below in connection with the appended drawings is intended to provide a description of various exemplary embodiments of infusers and related structures and is not intended to represent the only embodiments in which the invention may be practiced. The terms "exemplary" and "example" used throughout this disclosure mean "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be simplified or omitted entirely, in order to avoid obscuring the various concepts presented throughout this disclosure.

Not surprisingly, the advent of VADs have brought along with it significant privacy concerns. One common argument that has been advanced is that, because the voice information from a user and other sounds (e.g., footsteps) are recorded at a server location, that audio information in principle can be accessed by any individual with potential access to the recordings, including hackers located anywhere in the world. These individuals with potential access could also include, in addition to employees of the VAD-manufacturers/distributers themselves, marketing-driven personnel, sellers of personal data, and law enforcement officials. Other arguments responsive to VAD-manufacturers' continued assurances of privacy is that the VAD manufacturer is an interested party and such assurances cannot be certain to be reliable. The arguments further point out that regardless of good intentions, the behavior of people and institutions is not always predictable. Consequently, these opponents argue, it is not inconceivable that recorded information can eventually be used for even more nefarious purposes.

The distributors of these devices claim that VADs only record information when they are prompted by a wake command. Nonetheless, because these devices can record background information when searching for a prompt, and because the devices work in different ways and are at least in theory capable of recording any audible information at any time, the claims from the sellers that consumer privacy is preserved have sometimes been met with skepticism.

Articles and publications in recent years have been rampant about the potential privacy concerns of VADs. According to one article, employees at one major company marketing a particular VAD can easily obtain a user's home address. See, e.g., Matt Novak, *If You Care About Privacy, Throw Your Amazon Alexa Into the Sea*, Apr. 24, 2019. Another recent article notes that the same major distributor "apparently uses human-transcribed recordings to refine Alexa's capabilities." Mariella Moon, *An Amazon Employee Might Have Listened To Your Alexa Recording*, Apr. 11, 2019. A more recent article suggested that such VAD devices may be capable of outright surveillance. "Amazon, Apple, Google, Microsoft, and Samsung all have humans reviewing audio recorded through these devices." Violet Blue, *Hey Alexa: How Can We Escape Surveillance Capitalism?* See also Patrice Taddonio, *How Amazon Convinced Millions of People To Welcome "Listening Devices" Into Their Homes*; Joe Rossignol, *Apple Apologizes Over Siri Privacy Concerns, Will Resume Grading Program in Fall With Several Changes*, Aug. 28, 2019.

Another article noted that after a report was released in *The Guardian* detailing Apple's alleged use of contractors to "grade" the voice recordings obtained from users of Siri, the company has indicated that it will suspend the program. The same article indicated that Google and Amazon use humans as well, but each has ostensibly agreed to curb the practice in some way. *Wired: Security News This Week: Apple Contractors Will Stop Listening to Your Siri Recordings—For Now*, Aug. 3, 2019; see also Xavier Harding, Fortune Magazine, *Apple and Google Suspend Listening To Audio Recorded By Virtual Assistants*.

The apparatuses described herein will be referred to as the Talk-Lock apparatus, or Talk-Lock. In one aspect of the disclosure, Talk-Lock provides control to VAD users over when the VAD can or cannot hear user voice information as described in greater detail below. In various embodiments, Talk-Lock is always on. In various embodiments, Talk-Lock has an input power splitter that shares power received by VAD so that two separate plugs to two outlets becomes unnecessary, and so that Talk-Lock is always on when the associated VAD is operational.

In some embodiments, Talk-Lock is built with a housing that is geometrically configured to fit over necessary components of the VAD. Thus, the structural geometry of Talk-Lock's housing may vary depending on the geometry of the VAD design. Talk-Lock's housing may include, for each microphone of the VAD used by the VAD to receive acoustical input signals, a corresponding speaker within the housing of Talk-Lock that is aligned with and opposed to each such VAD-based microphone. In a first mode of operation determined by an internal processing system of Talk-Lock, the speakers are configured by the processing system to continuously and directly output an interfering auditory signal composed of one or more interfering frequencies or frequency bands (corresponding, for example, to various voice frequencies) into the VAD microphones while in the first mode. The purpose of the interfering auditory signal (which may also refer in this disclosure to a cumulative plurality of auditory signals from one or more physical drivers) is to prevent the VAD from interpreting ongoing voice or other audible information sourced in a region proximate the VAD, including in some embodiments in further locations within the range of the VAD, while Talk-Lock is in the first mode.

Thus, for example, Talk-Lock can sit atop and/or around a VAD, as necessary to provide the interfering audible signal to each microphone. The audible signals may be identical for each microphone, although this need not be the case. In other cases where the microphones are tuned to different frequencies in the audible spectrum, for example, the audible signals from Talk-Lock may be different for different VAD microphones. Also, the shape, size and number of the apertures of the Talk-Lock microphones may vary widely depending on the features of the VAD and overall design considerations.

Talk-Lock is advantageously configured to enable a user to have unfettered access to the control inputs of the VAD, since the geometry of Talk-Lock's housing is selectively shaped to input auditory signals into the VAD microphones while simultaneously being shaped to enable access to VAD controls and VAD output speakers. As an illustration, various VAD models include cylindrical shapes. In certain such VADs, the microphones of the VAD may be arranged in a simple pattern on a top surface of the VAD, whereas the primary VAD speaker(s) may extend around the cylindrical body. In this example, the housing of Talk-Lock can be shaped to cover the VAD microphones with the aligned Talk-Lock speakers along the circumferential area of the VAD, while concurrently allowing a user to access the VAD buttons disposed towards the center of the top surface. Thus, Talk-Lock is configured to avoid interfering with the VAD operation, meaning that the benefits that the VAD offers a user can remain any time the user desires access.

In various embodiments, Talk-Lock's housing may be configured to seal the VAD microphones from external acoustical noise. For example, an internal surface of Talk-Lock may include a rubber or other material that acts to dampen acoustical activity external to the microphone-speaker region defined by the VAD and Talk-Lock housing, respectively. In some embodiments, the housing additionally or alternatively acts as a rubber seal (e.g., by providing one or more ridges) around a general region where the microphones of the VAD are arranged. Thus, for example, the Talk-Lock housing may include an edge that acts as an acoustic seal using an appropriate rubber or other conventionally-known material. The acoustic seal may in some embodiments sit flush with a surface of the VAD, and in other embodiments may form a plurality of nubs or ridges to provide isolation. In still other embodiments, both techniques may be used. In more sophisticated embodiments wherein the housing of Talk-Lock is intended to be permanently affixed to the VAD, fasteners or adhesive may be used.

Talk-Lock may be equipped with one or more microphones arranged at an external surface of the housing. The microphones and Talk-Lock speakers may be coupled to the Talk-Lock internal processing system. Talk-Lock may initially be configured in a first, or a jamming, mode of operation in which the Talk-Lock speakers on an internal surface of the housing emit the interfering auditory signal to all VAD microphones. Meanwhile, the Talk-Lock microphones, arranged in some embodiments on an external surface of the housing, monitor for a unique authorization input, which may be an auditory signal. When the Talk-Lock microphones register such an authorization input, a user effectively causes the Talk-Lock processing system to enter a second mode of operation, which allows the VAD to operate in its normal mode. For example, in one embodiment, when the user desires to allow the VAD to hear and process a command, the user may initiate a clap sequence. The command may be a double-clap, for example, which can disarm Talk-Lock.

More specifically, upon hearing that authorization input via the Talk-Lock microphones, the processing system or other internal circuits may enter a second mode that causes a switch to route the microphone inputs of the Talk-Lock on the housing external surface to corresponding Talk-Lock speakers on the housing internal surface. Then, when the user issues a request or command, the user's voice information passes through the Talk-Lock microphones and is transmitted as an audible voice signal into the array of VAD microphones. In more sophisticated embodiments, Talk-Lock may include amplification circuitry and filtering to bolster the passed-through signal and provide further clarity for the VAD inputs.

The VAD may thereupon respond appropriately to the user's request, e.g., by identifying that week's requested weather forecast using the VAD speakers, by engaging the lights at a residence, etc. Alternatively, the VAD may turn on the "smart" television using a transceiver.

Thus, using the double-clap authorization input (as an example), the Talk-Lock may switch to the second mode and terminate the interfering signal for a designated period of time, e.g., 30 seconds, or, for example, long enough for the VAD to receive a request and respond to it without receiving unwanted interference. Upon expiration of the 30 seconds, the Talk-Lock may return to the first mode and re-commence the interfering audible signal from the Talk-Lock speakers, again blocking external voice or audio content. Meanwhile, as it returns to the first mode, Talk-Lock uses its microphones to monitor for other possible authorization inputs.

In another embodiment, the user may initiate another authorization input such as, for example, a triple-clap sequence. The triple-clap sequence may cause a long term transition from the first mode to the second mode, such that the interference is terminated and the Talk-Lock microphones pass audible requests via the Talk-Lock speakers to the VAD microphones for an indefinite duration. A second triple-clap sequence may cause the Talk-Lock to return to the first mode as it re-commences the interfering signal and its microphones return to listening for a subsequent authorization input. A number of different embodiments are possible, and the Talk-Lock may be toggled between modes with both an automatic return to mode one feature and an unlocking feature that requires affirmative action to re jam the device and reacquire privacy for voice content and other noises.

Accordingly, it should be understood that the clap sequences and the manner of switching between first and second modes are exemplary in nature, and other authorization inputs and time periods are possible. For example, the authorization input may instead be designated to be a suitable phrase (e.g., "engage voice assistant") received by the Talk-Lock microphones and recognized by the processing system as a trigger to switch modes. Other clap sequences or alternative conspicuous auditory formats may also qualify as authorization inputs. In addition, there may be multiple authorization inputs that correspond to different time durations that the processing system switches modes, whether the mode switch is permanent in duration until a second authorization input is received, etc. Each of these variations are contemplated to fall within the scope of the disclosure.

In various embodiments, the processing system is air-gapped. "Air-gapped" refers in the cyber security field to mean a computer or other electronic device having no direct connection to the Internet or to any other computer that is connected to the Internet, for security reasons. Air-gapped processors or devices as used herein are isolated from any and all networks and cannot be accessed remotely or otherwise, without cracking open the device. That is to say, the housing of the Talk-Lock has no inputs, outputs, or other interfaces—wired or wireless—to or from the processor or processing system on the one hand, and the external environment of the housing on the other hand. In these embodiments, the Talk-Lock apparatus is effectively isolated from any network and cannot be hacked. In particular, the Talk-Lock apparatus must be broken open or physically disabled to neutralize it. Talk-Lock can in no way be disabled from afar. This is in stark contrast to VADs, which are by definition networked and are as susceptible to being hacked as any other networked device.

FIG. 1 is a perspective view of a Talk-Lock device coupled to a conventional VAD in accordance with an embodiment. Initially it should be understood that the cylindrical structure 112 is a conventional VAD that is commercially available. The inventor claims no patent rights and no other ownership interest in the VAD itself, nor the VADs described herein. Apparatus 100 is referred to herein as the Talk-Lock apparatus. The Talk-Lock apparatus 100 is so named because as illustrated herein, the apparatus is configured to prevent the VAD 112 from interpreting certain voice and other auditory information/noise that may, inadvertently or otherwise, be received and/or recorded at facilities used by the businesses that distribute and provide services for the VAD in question.

The disclosed Talk-Lock housing 104 in the embodiment of FIG. 1 is ring shaped, with a single member 110 extending to an input power source. The ring-shape embodiment is inspired by the various ring or cylindrical shaped VADs currently commercially available. It will be appreciated by those skilled in the art upon perusal of this disclosure that the Talk-Lock apparatus may take any number of functional forms dictated primarily, although not necessarily exclusively, by the geometry and structural features of the underlying VAD. By way of example, the Talk-Lock apparatus 100 of FIG. 1 includes a housing 104 that is shaped to selectively cover an upper portion of VAD 112 (see, e.g., FIGS. 3A, 4A). More specifically, housing 104 can be built to extend around a circumference of VAD so that it can provide the functional components, such as a secure rubber or foam seal, that enable Talk-Lock 100 to protect users of the VAD from unnecessary or unintentional communications by the user or others in the VAD proximity that may otherwise be acquired and/or recorded.

The housing further includes microphones 106a and 106b arranged at an edge of an external surface 105 of housing 104. The microphones 106a and 106b are selectively coupled to a processing system in a first mode, whereupon the processing system monitors the external environment for an authorization input (e.g., a recognizable clap sequence). The microphones 106a and 106b are then coupled to an input of internal housing speakers in a second mode to allow the acoustic input from the external environment to be routed to the VAD microphones to enable use of the VAD. While two opposing microphones are shown in this example, in other examples a different number of microphones may be used. In addition, the shape of the microphone apertures may be circular, elliptical, or any other suitable form. In some embodiments, the number of microphones of the Talk-Lock 100 may match the number of VAD microphones (obscured from view) such that each Talk-Lock microphone is coupled to exactly one VAD microphone when the Talk-Lock is operated in the second mode. In an embodiment, the first and second modes, and hence the output of the Talk-Lock microphones, is controlled by one or more processor-controlled switches that toggle the Talk-Lock microphone outputs (i.e., those output carrying the received audible noise from the external environment) to one of the two positions (i.e., the processing system in the first mode, and the VAD microphones in the second mode).

In some embodiments, housing 104 includes an edge region 118. The edge region 118 may assist in some embodiments by providing a seal around the cylindrical VAD 112. In some embodiments, the edge 118 or any portion of the overhanging lip 125 may be ringed with rubber acoustic coupling in the form of ridges or nubs, or the lip 125 may instead be flush against the VAD housing, or it may use both techniques or other techniques. These sealing techniques can (i) adhere the housing 124 to the VAD using basic principles of friction and suction, (ii) help prevent feedback to the Talk-Lock microphones or the leakage of the interfering auditory signal, and (iii) help isolate the VAD microphones further from the external environment, where individuals may be talking in the proximity of the VAD. In other embodiments, the positioning of this ringing may be on a surface of the housing 104 outside the area of the VAD microphones (obscured from view).

FIG. 1 also includes an LED light 108. In other embodiments, more than one LED light, or another type of indicator, may be used. The LED light 108 may convey to the user which mode the Talk-Lock 100 is in. Red may indicate a first (VAD blocking) mode, for example, and green may indicate a second (VAD operational) mode. Housing 104 may further include a power switch, although given that the Talk-Lock 100 may be engaged at all times, a power switch may not be necessary or desired.

The VAD 112 shown in FIG. 1 includes a speaker 121 that extends around its circumference. Thus when the VAD 112 is operational, the Talk-Lock advantageously refrains from blocking the speaker.

The housing 104 further includes a member 110 that extends from external surface 105 to a power supply input 114. In various embodiments, the power source is split with the VAD 112 and obtained from the VAD 112. In this fashion, the two units will be powered up together, or not at all. In other embodiments, the member 110 may harbor separate plugs. In some cases especially for smaller VADs having a similar shape, member 110 may not be needed, and the entire processing system may be housed in the upper portion of frame 104. Input 127 represents the power input to the VAD, and is not itself part of the Talk-Lock 100. The electrical power may be split between the two devices using any conventional means. In various embodiments, the member 110 includes one or more power lines that extend to the processing system and the LED light 108.

Housing 104 may include a straight member 129 that extends between opposing points on the circle. In this particular VAD, a microphone is also present in the center of the surface. Straight member 129 includes a speaker (obscured from view) aligned with the central VAD microphone, as noted above. Straight member 129 is also big enough to incorporate a ringed seal around the VAD microphone.

As noted above, subsequent VADs may take on different shapes. Accordingly, the geometry of housing 104 need not be limited to that of the ring shape shown. Rather, the housing is more likely to be contoured to control functional portions (e.g., the VAD microphones) of the particular VAD that it is monitoring, which may in some cases be another shape.

Figure 2:
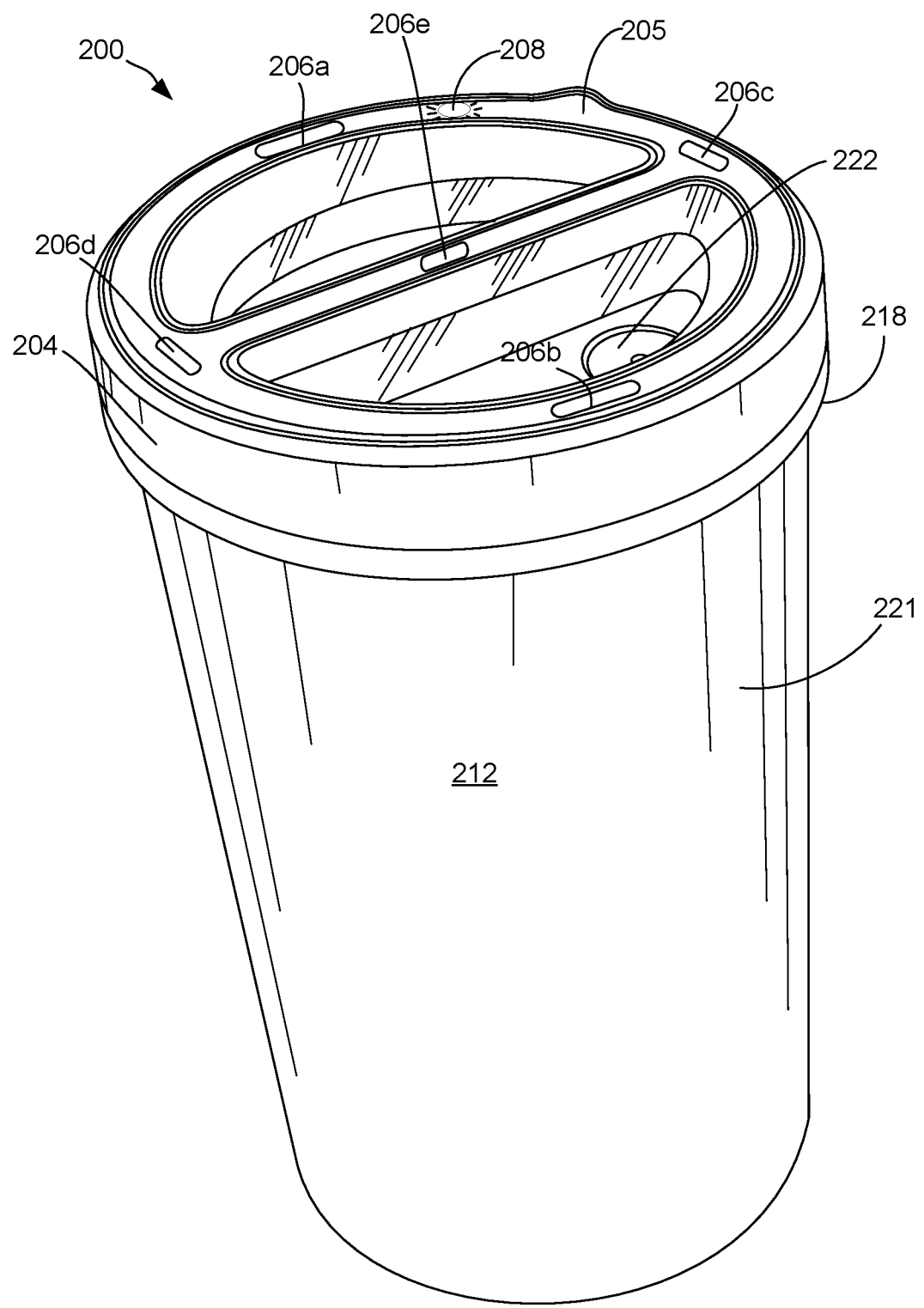
FIG. 2 is another perspective view a Talk-Lock device coupled to the VAD in accordance with an embodiment.

FIG. 2 is another perspective view of Talk-Lock apparatus 200 coupled to the VAD 212 in accordance with an embodiment. Talk-Lock 200 represents an alternative perspective view of the device 100 of FIG. 1, with member 110 facing an opposite direction and thus obscured from view by VAD 212. Talk-Lock apparatus 200 includes housing 204, which in turn includes external surface 205 and edge region 218. The only significant difference between Talk-Lock 200 and 100 is that Talk-Lock 200 in FIG. 2 includes on its external housing five microphones 206a-e instead of two. The microphones 206a-e are positioned proximate the five corresponding VAD microphones (obscured from view) and are configured in a second mode to couple to Talk-Lock speakers that align with the five VAD microphones.

In FIG. 2, a portion of the top surface of VAD is visible. Specifically, the user controls are placed on the top, and the gaps in housing 204 enable a user to reach in between the housing members and depress the control buttons such as VAD control button 222. In this manner, with the VAD speaker 221 arranged around the cylindrical portion to provide audio under VAD operation, and the control buttons such as button 222 accessible, Talk-Lock does not interfere with any aspect the operation of the VAD 212 whenever the VAD is desired to be operational.

Figure 3A:
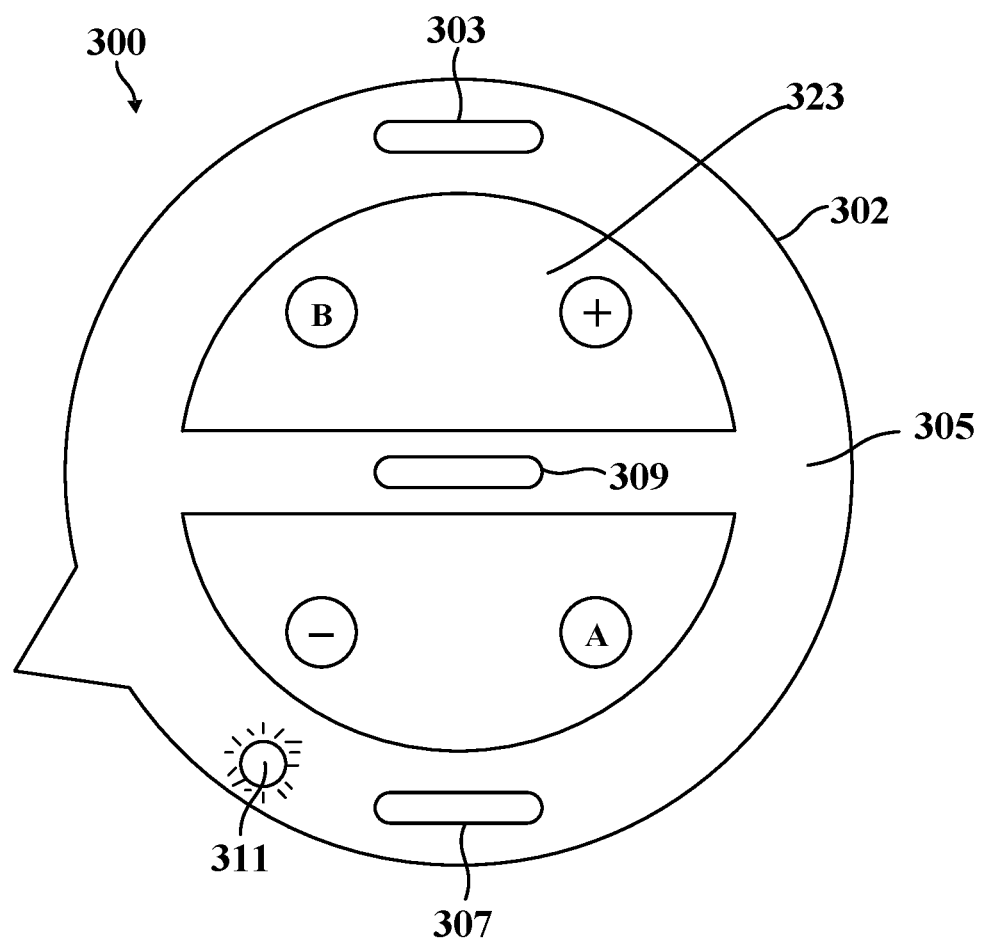
FIG. 3A is a top view of a Talk-Lock with the surface buttons of the VAD accessible.

To that end, FIG. 3A is a top view of a Talk-Lock 300 with the surface buttons of the VAD accessible. In the view of FIG. 3A, VAD is standing like a cylinder, with the top surface 323 of the VAD visible and the external surface 305 of Talk-Lock 300 arranged around a circumference of the cylinder, as before. For simplicity, two Talk-Lock microphones 303 and 305 are shown for monitoring for authorization inputs in a first mode, and for providing voice input to the VAD in a second mode. In the embodiment shown, the VAD controls may include button A and B for controlling various aspects of the VAD, and + and − buttons for controlling speaker volume, for example. It is noted that, even where a control button is provided to purportedly disable the VAD microphones, the VAD processor is networked as a matter of necessity and is therefore as hackable as any other networked device. Further, the use of such a disabling feature requires sole reliance on the distributor of the VAD, whereas Talk-Lock is an artifact of a neutral third party. FIG. 3 further shows an edge 302 of Talk-Lock 300, which may include a rubber or foam seal, for example, to provide additional sound isolation in both directions.

Figure 3B:
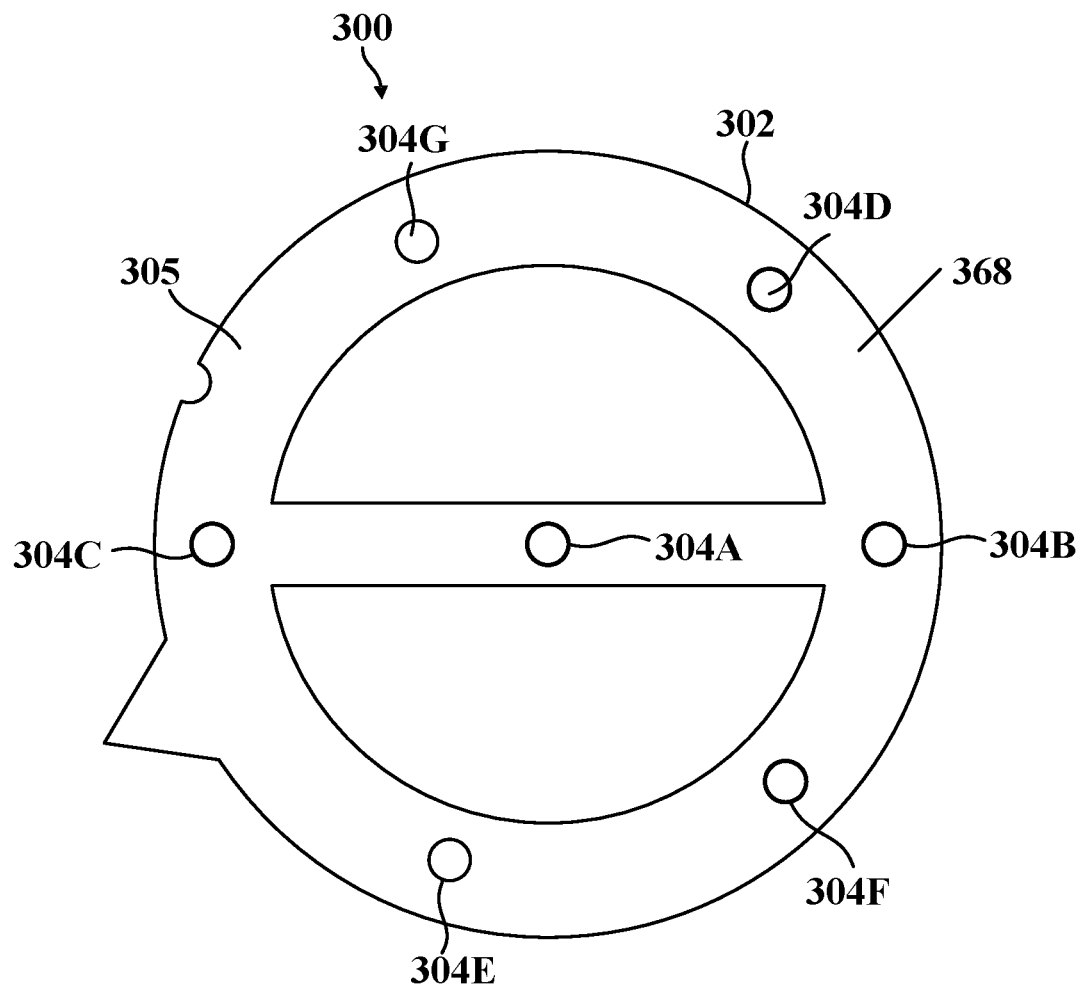
FIG. 3B is a view of the interior surface of a top portion of the Talk-Lock.

FIG. 3B is a view of the internal surface 368 of a top portion of the housing of a Talk-Lock. Thus FIG. 3B is an inverted view of FIG. 3A. The housing 305 includes an internal surface 368 configured to face the top surface of the VAD. In the embodiment shown, housing 305 includes seven speakers 304A-G that allow for "far field" audio operation, which may be coupled in the second mode to microphones 303 and 307 using any suitable means. "Far field" is a technology used on at least Amazon VADs, and is described as using an array of microphones necessary to distinguish sounds within a room. (In other embodiments, Talk-Lock includes seven microphones, each for one Talk-Lock speaker). As noted above, each of speakers 304A-G is aligned with and opposes a corresponding VAD microphone—in this case seven microphones are employed on the VAD. The size of the speakers may vary depending on the various factors, but can be about 16 millimeters (mm) in some embodiments.

Each of the speakers emits an auditory signal configured to interfere with external voice exchanges or other audible input. As noted above, the auditory speakers may each emit an identical signal as governed by the processing system. Alternatively, each speaker may emit an interfering auditory signal that more closely matches the bandwidth characteristics of the VAD microphone with which it is aligned. For example, certain VAD models rely on far field voice recognition to recognize voice information from potentially much longer distances. Thus, in one embodiment, a matching number of seven speakers are provided to customize, in the first mode, the interfering auditory signal out of each speaker by, for example, storing and executing code in the processing system that maximizes the effectiveness of the jamming auditory signal. Alternatively, in the second mode, a Talk-Lock may include a matching number of Talk-Lock speakers 304A-G and Talk-Lock microphones (not shown) to maintain the far field capabilities of the VAD and allow for far field voice recognition.

In various embodiments, the circular border of each speaker 304A-G may include a rubber or foam seal that complements or replaces the seal at edge region 302 of housing 305. In these embodiments, each of the VAD microphones is further isolated from the VAD's external environment while Talk-Lock 300 is in the first mode. The remainder of the housing may constitute any number of materials, such as a metal (e.g., aluminum) or a metal alloy. Alternatively, various non-metals may be used to form the housing, including materials with favorable acoustic separation characteristics.

Figure 3C:
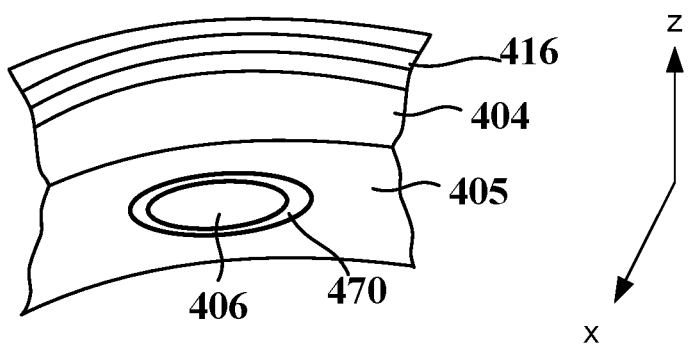
FIG. 3C is an exemplary cutoff portion of a wall surrounding an interior surface of the Talk-Lock.

FIG. 3C is an exemplary cutoff portion of a wall 404 surrounding an interior surface 405 of the Talk-Lock. Talk-Lock speaker 406 is shown for reference. It should be noted that Talk-Lock speakers need not create circular regions in the interior wall, but instead the regions may be ellipses (e.g., speaker 406) or other forms. Wall 404 has a plurality of ridges 416 that may be rubber, form, or another material designed to assist in forming a seal between the Talk-Lock and the VAD. Alternatively or additionally, speaker 406 itself may also include a ridge area 470 that contacts a region of the interior surface around the individual speaker to provide double isolation. The X-Z Cartesian coordinate axis is shown here to emphasize that wall 404 is generally at an angle perpendicular to interior wall 405, but this positioning can change based on the shape of the VAD.

Figure 4A:
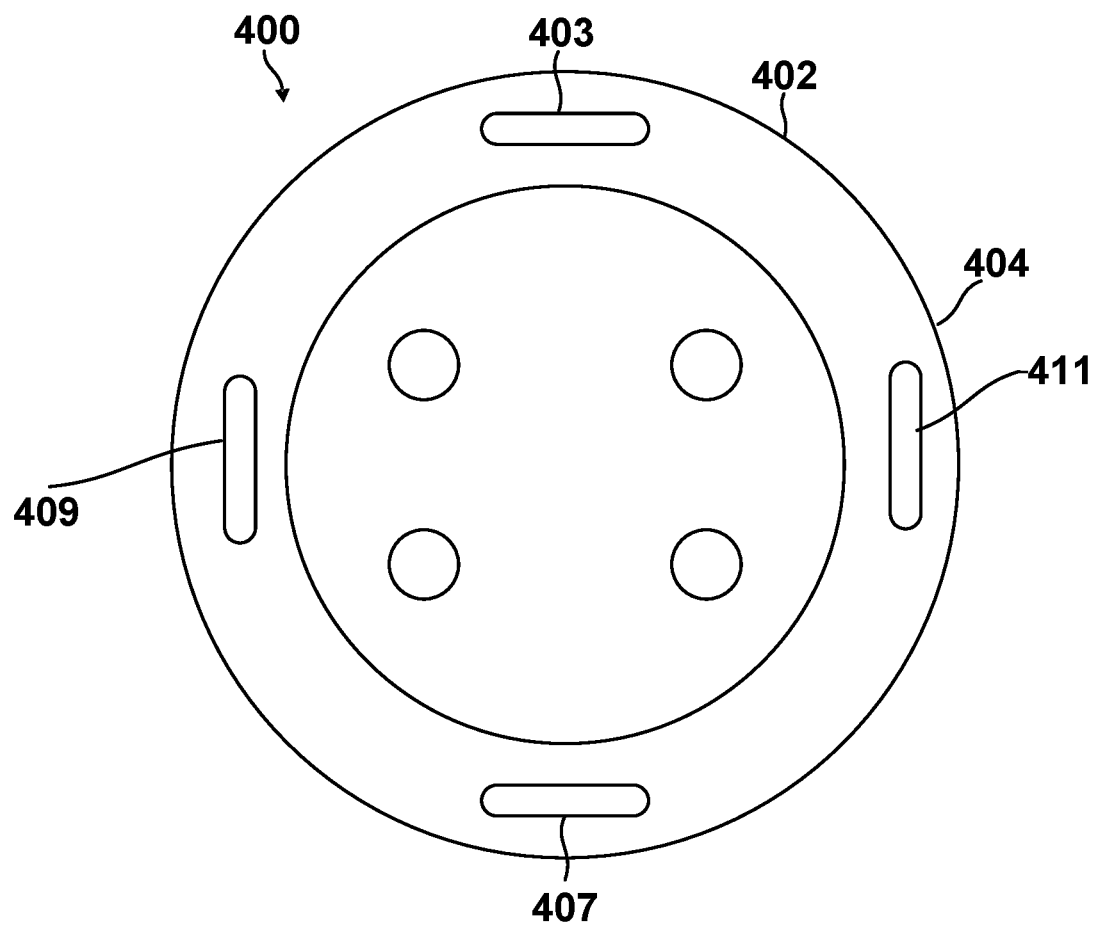
FIG. 4A is a top view of an external surface of an exemplary Talk-Lock configured with microphones for receiving clap or similar sequences and internal circuits of a VAD over which the Talk-Lock is arranged.

FIG. 4A is a top view of an external surface of an exemplary Talk-Lock 400 configured with microphones for receiving clap or similar sequences and internal circuits of a VAD over which the Talk-Lock is arranged. Circular VAD control buttons may reside in the center in this design as shown. However, this particular VAD model includes no central speaker. Accordingly, the frame 404 in this embodiment need not include the cross-member 129 as in FIG. 1. Four microphones 403, 407, 409 and 411 are used by Talk-Lock to monitor for an authorization input or to pass through a voice input, depending on the mode in play at any given time. Like before, edge region 402 may include a wall with ridges for providing further noise isolation unrelated to transmission of the Talk-Lock jamming signals.

Figure 4B:
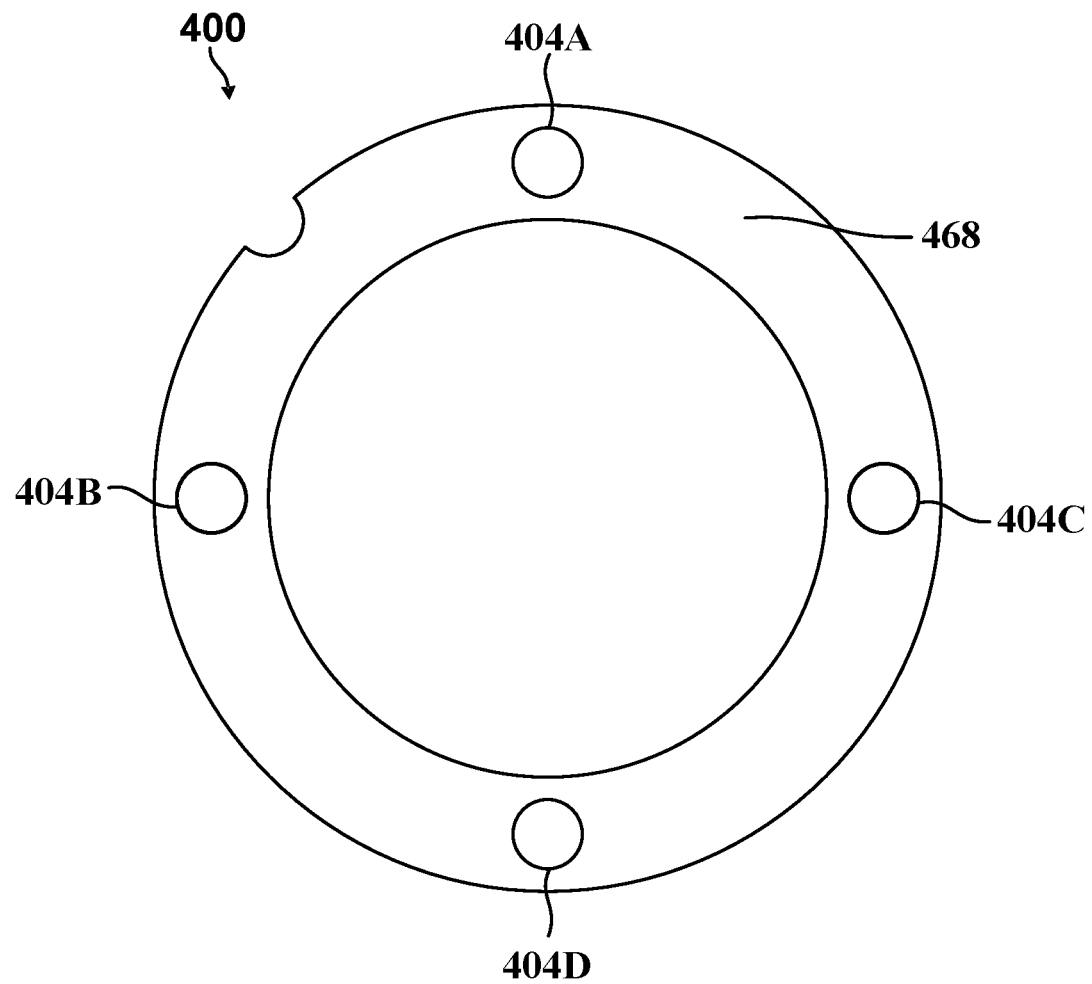
FIG. 4B is a view of an interior surface of an exemplary Talk-Lock with speakers configured to align with microphones of a particular VAD.

FIG. 4B is a view of an internal surface 468 of an exemplary Talk-Lock 400 with speakers 404A-D configured to align with microphones of a particular VAD. In some embodiments, each of the microphones 403, 407, 409 and 411 are individually aligned to pass an audio signal to respective speakers 404A-D. In practice, this need not be the case. For example, the Talk-Lock 400 may use a common connective trace to couple the respective devices, or the microphone-speaker connections may in principle be arbitrary. Transducers and other circuit elements may be placed in the housing including between or proximate the Talk-Lock speakers 404A-D and corresponding VAD microphones, as is commonly understood, to transmit and receive audio signals, and to convert audio to electrical signals and/or electrical signals to audio, as appropriate under the circumstances.

Figure 5:
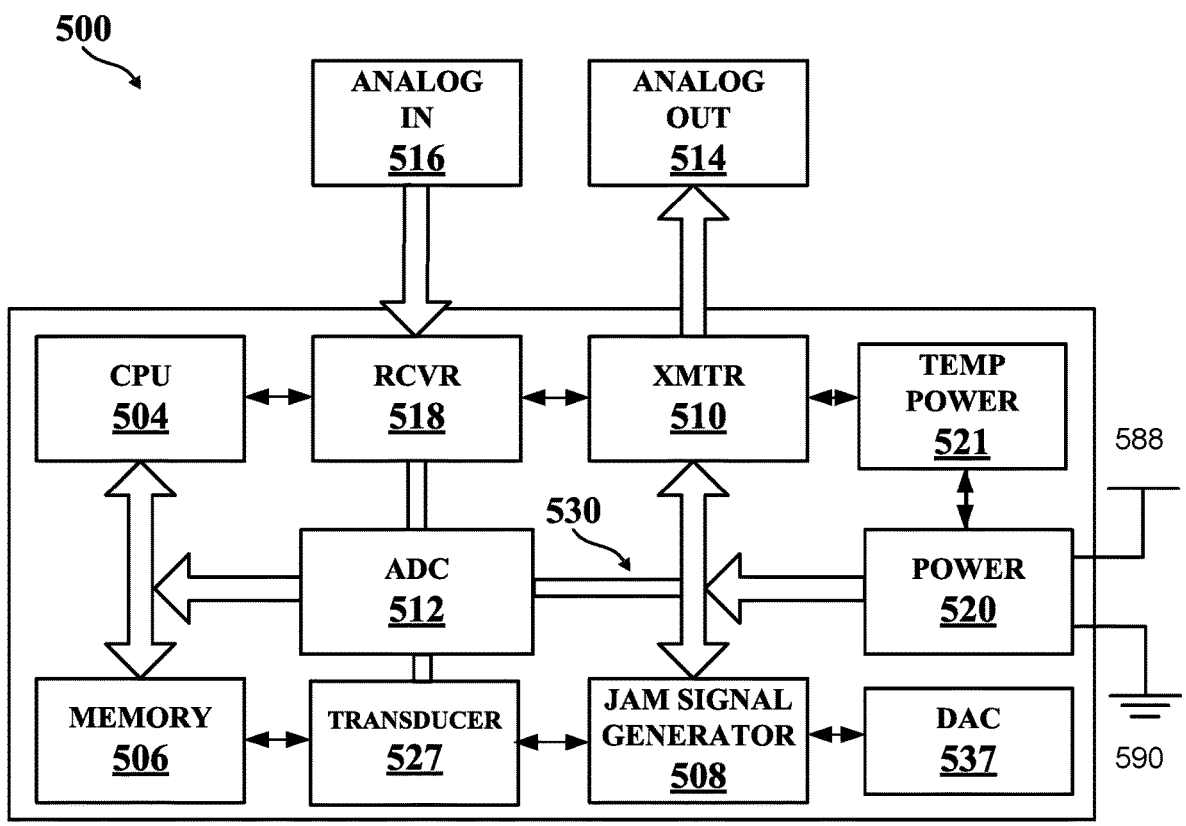
FIG. 5 is an exemplary block diagram of printed circuit board including a processing system within a Talk-Lock apparatus.

FIG. 5 is an exemplary block diagram of printed circuit board including a processing system 500 within a Talk-Lock. It should be noted that, while different blocks in the diagram have specific names and perform various functions, in practice two or more blocks may be part of a signal circuit. By contrast, some of the blocks may in some embodiments perform functions using more than one circuit element or device. Also, the blocks may differ to correspond to different embodiments. For example, while the processing system 500 shows analog in 516 and analog out 514 blocks, in other embodiments these signals may be digital signals used to control the relative coupling of the Talk-Lock microphone(s) and speaker(s) during operation of one of the two modes. Thus, in those embodiments, digital connections may be present in lieu of, or in addition to, analog connections.

Processing system 500 includes a CPU 504. In practice the CPU 504 may be one or more processors, a microcontroller, a digital signal processor, programmable array logic, or any suitable hardware for implementing the code or Boolean functions necessary to operate within the two modes of operation and to control the LED light or other functions if present.

CPU 504 may be coupled to a memory. The memory may include one or more of cache memory, random access memory, DRAM, SRAM, read only memory, flash memory, PROMs EPROMS, EEPROMS, or any suitable form of memory. The memory may store data and any necessary code for operating the Talk-Lock in both modes of operation, i.e., for transmitting the interfering audible signal in one mode and for effecting the microphone-to-speaker pass-through in another mode. Thus, CPU 504 is also part of the processing system that executes code for sending one or interfering audible signals 508 from an audible signal generator 508, for example. The jamming signals may be carried from the generator 508 (or in designated memory locations stored in memory, and/or sent out to the transmitter 510), where they can be transmitted via an analog out 514 to their respective speakers. A transducer in each of the speakers converts the electrical signal to an acoustic (audible) interfering signal. The audible interfering signal is thereupon provided to a corresponding VAD microphone. In other embodiments, the transducer(s) 527 and associate audio circuitry may be located on the printed circuit board.

Memory 506 may provide to CPU 504 information concerning the transmitted signals, such as the volume of the signal and varying frequencies needed to protect the user in the first mode. Information needed to stifle the VAD's capability to interpret human voices may be provided and that information may be used to configure the analog signal transmitted to the Talk-Lock speakers. In some embodiments, the housing of Talk-Lock may be adjusted via a new switch that can be used to increase or decrease the volume of signal power as well as frequencies of the signal. This significance of the different modes may be conveyed to a user of the Talk-Lock, e.g., via a user manual. In order to maintain the air-gapped nature of the processing system 500 (typically including one or more CPUs or processors, system memory 506, and the control circuitry that processes the audible information), any additional switches should not allow a user to inject into the Talk-Lock any code or to bypass any protections of the sealed housing that contains the processing system 500.

The processing system 500 may also include a receiver 518 for receiving analog signals corresponding to input being monitored at the microphone(s) of Talk-Lock while in the first mode. Unless and until the CPU code recognizes a valid authorization input, the CPU will generally maintain the Talk-Lock in the first mode and continue to cause the speakers to provide an interfering auditory signal to the VAD microphones. In various embodiments, auditory signals external to the Talk-Lock are sent to the microphones arranged on the external surface of the housing, for example. The microphones receive the auditory information, convert the information into electrical signals and convey the signals to an analog input circuit 516, which may be on the printed circuit board or otherwise may be local to the microphone. The signals may be amplified and filtered at the analog input circuit 516, and then provided to receiver 518 and/or to a cache memory. The CPU 504 runs code to assess whether the provided information matches any pattern of an authorization input, or instead is not relevant. If an authorization input is recognized, the CPU 504 may cause the microphones on the external surface of the housing to switch to a "pass through" mode where the speakers are decoupled from the source of the interfering signal and instead coupled to their designated Talk-Lock speakers. Thus users can query the VAD microphones using this new coupling. During this second mode, operation of the VAD can proceed until a designated time period has passed or until another authorization input is received at the microphone, in which case the speakers may be coupled back to the source of the interfering audible signal and the microphones are directed to monitor for additional authorization input signals.

The received input signal may be converted into a digital signal by analog to digital converter 512 so that the signal can properly be read by the CPU. In other embodiments, decoders or other digital circuits may be used to assist in preparing the CPU to read the cached data received.

A power source 520 may be used to power the various components of the processing system. For example, a DC input and ground, or other power configuration, may be provided to the processing system, either remotely or via an on-board AC-DC converter. In some embodiments, a temporary power source 521 (e.g., a battery) may be used in the case where a temporary power source is desired as a backup (e.g., in embodiments where the power is sourced separately from the VAD device). Processing system 500 also shows a transmitter that transmits the interfering audible signal from a jamming signal generator 508. The signal may be sent via transmitter 510 and analog out 514. In some embodiments, the information from jamming signal generator 508 may undergo additional processing, such as via a digital-to-analog converter 537, before being provided to the speakers.

It will be appreciated that, while processing system is shown in this embodiment as primarily being contained on a single circuit board, in other embodiments the components may be provided at different locations without departing from the spirit and scope of the disclosure. For example, the analog-to-digital converter 512 may be arranged close to the Talk-Lock microphones, or the digital to analog converter close to the Talk-Lock speakers, etc.

Figure 6A:
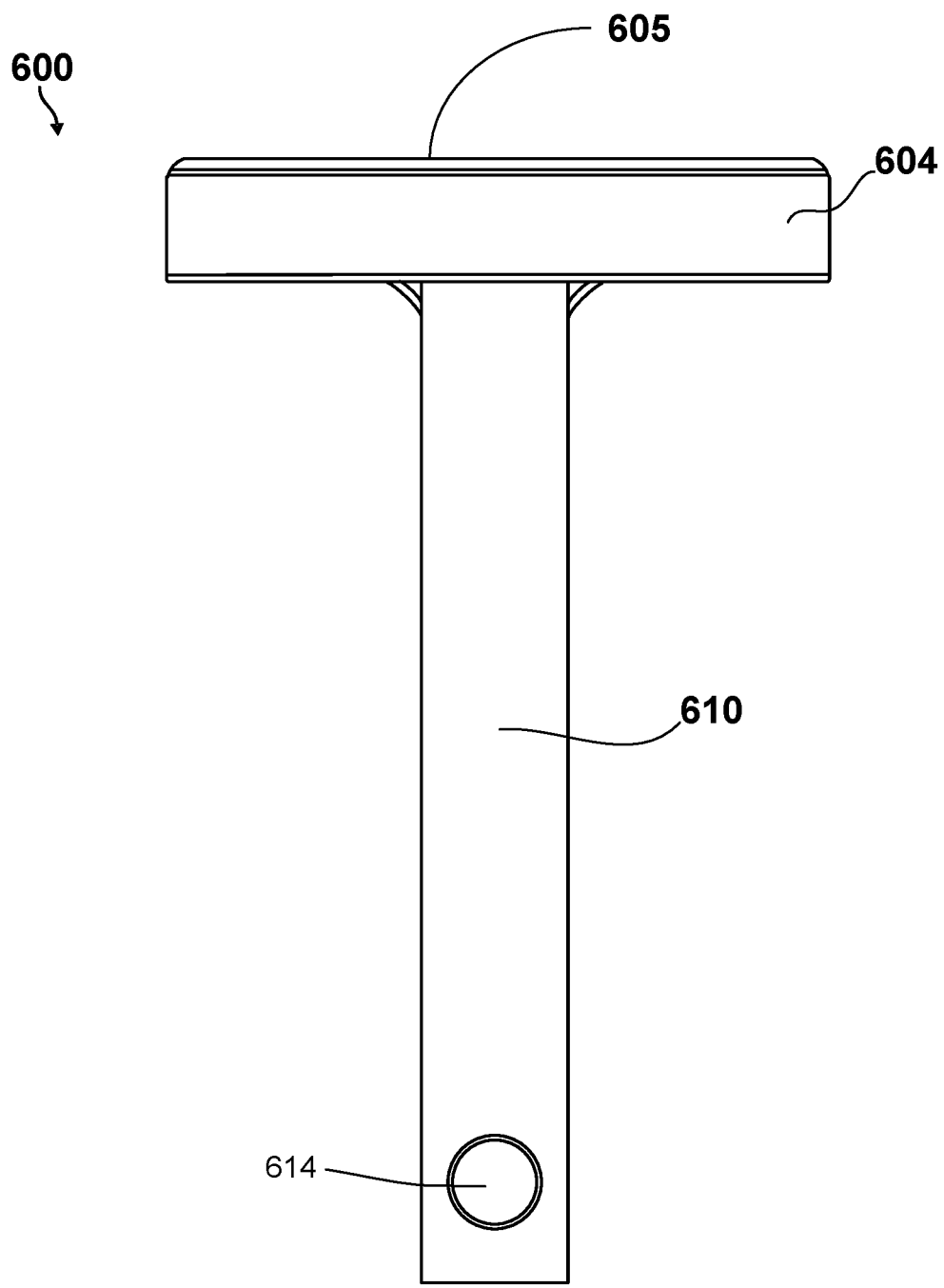
FIG. 6A is a front view of an exemplary Talk-Lock apparatus independent of the VAD.
Figure 6B:
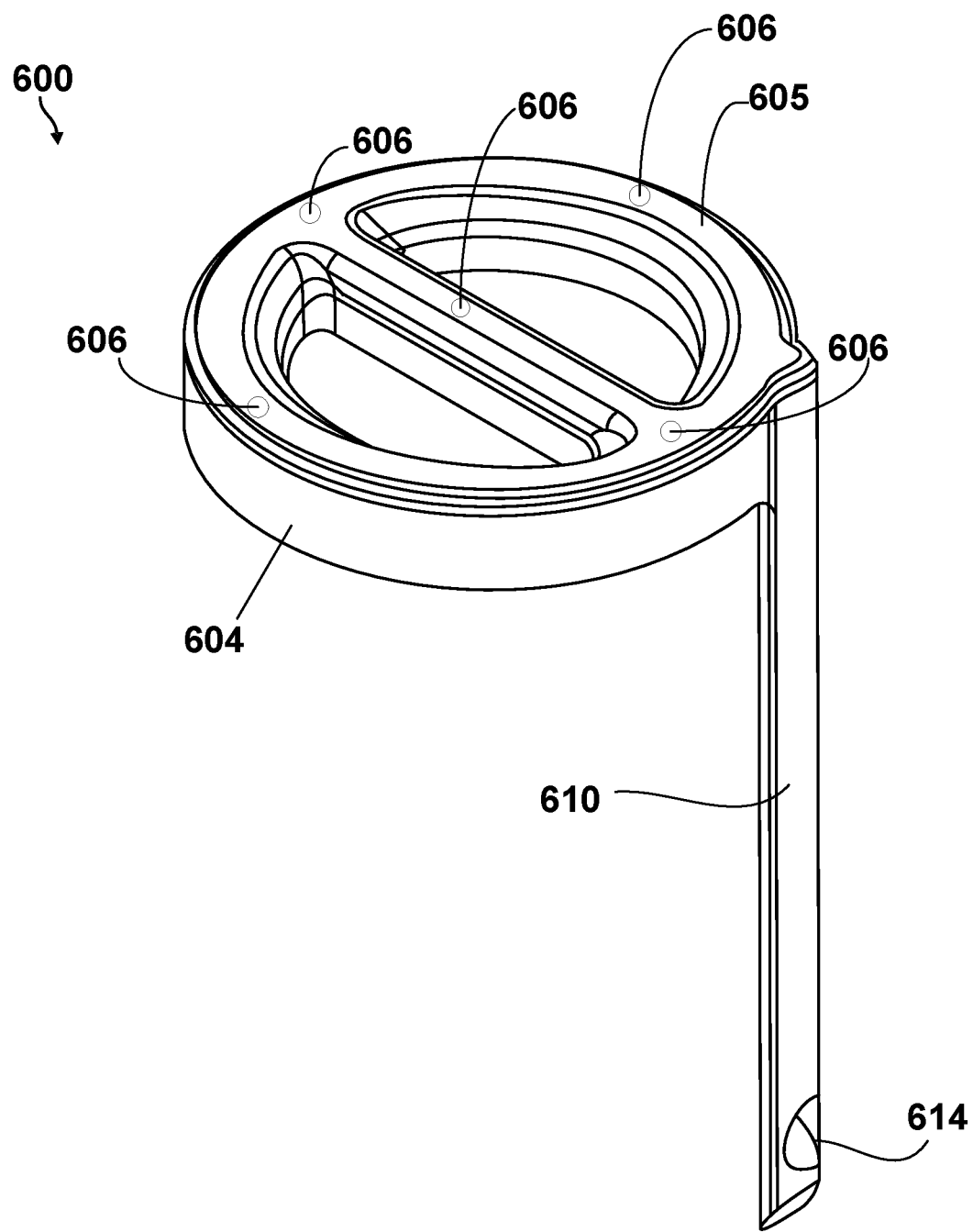
FIG. 6B is a perspective view of the Talk-Lock apparatus of FIG. 6A.

FIG. 6A is a front view of Talk-Lock apparatus 600 without being installed on a VAD. As before, Talk-Lock 600 includes housing 604, external surface 605, member 610, and input power source 614. FIG. 6B is a perspective view of the Talk-Lock 600 of FIG. 6B, with similar components, except that Talk-Lock microphones 606 on the external surface 605 of the housing are visible in this view. It should be noted that the housing generally will be manufactured big enough such that the necessary physical components and/or printed circuit board will fit into the housing. In the device of FIG. 6B, member 610 can be configured to include an input power jack adjacent input 614. Member 610 can be made wide enough to channel a group of two to three wires to bring power and ground to the processing system, that may be resident on one or more boards in housing 604. To this end, it should be noted that FIG. 6 is not necessarily drawn to scale, and housing 604 and/or member 610 can be modified to accommodate the circuit components discussed in more detail above.

Figure 7:
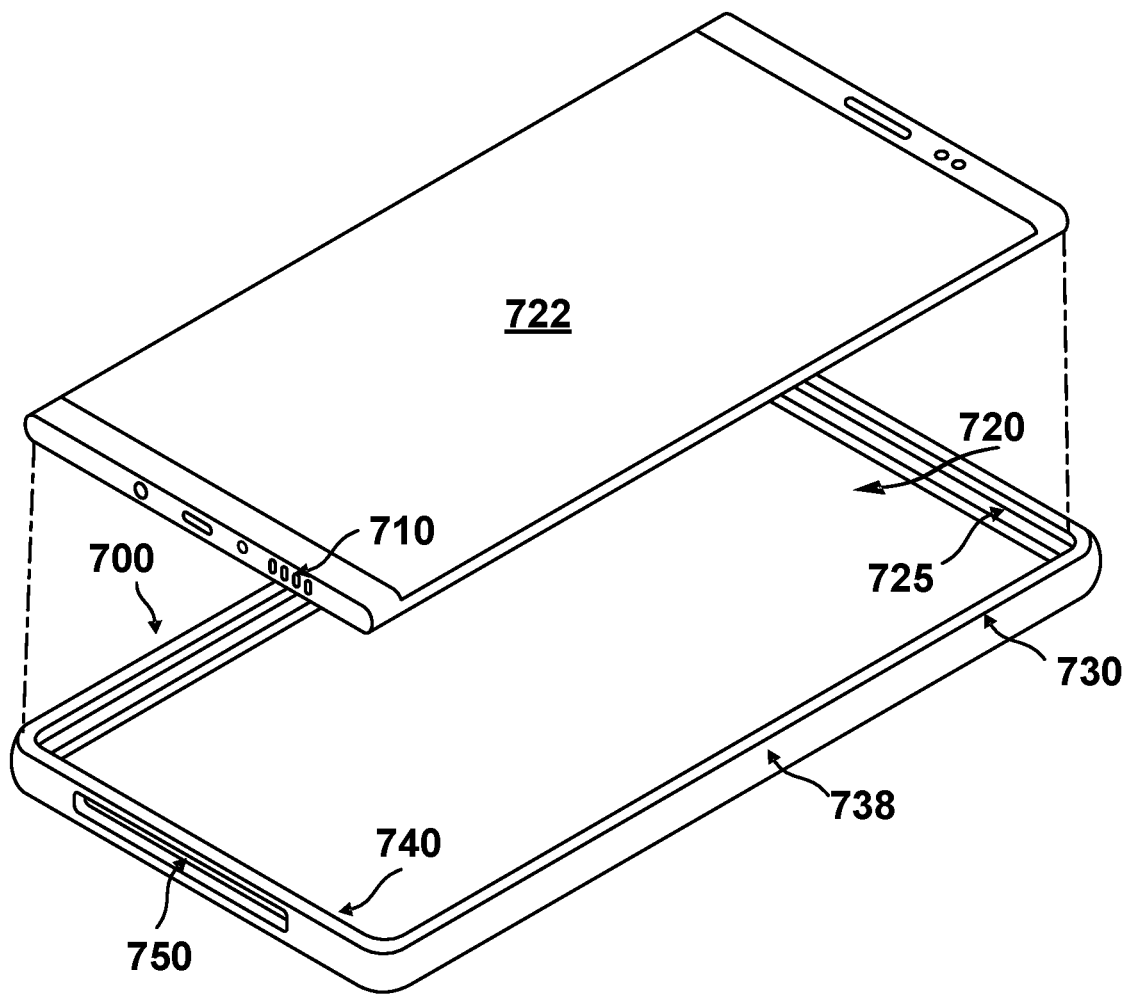
FIG. 7 is a perspective view of a mobile device and a Talk-Lock apparatus configured for use with the mobile device in accordance with an embodiment.

FIG. 7 is a perspective view of a mobile device and a Talk-Lock apparatus configured for use with the mobile device in accordance with an embodiment. As noted above, VADs are intended for purpose of this disclosure to include virtual assistants. Most modern iPhone® owners are familiar with a virtual assistant, as well as those that use Android-based mobile devices. Such assistants present the same privacy challenges as the hardware-based assistants above. Generic smart-phone 722 is shown in FIG. 7. A typical location of microphones for various brands of mobile phones may be at the lower left edge such as microphone array 710. In operation and typically by default, the voice assistant is looking for a "wake" word or the depression of an input button to become activated. Privacy concerns can arise, however, because given that private information has a value, typically such claims that material is never recorded require reliance on the very entities that would benefit from accessing the information—the distributors of the devices. It is anticipated that the processing system, such as described in FIG. 5, would be embedded in housing 720, which is the same housing into which the mobile device can easily and snugly be fit.

Housing 720 of Talk-Lock 700 also includes a wall 738 that can extend around a peripheral region of the mobile device 722. Inside of wall 738 of Talk-Lock 700 is an inner region 725 that can be used to help provide an acoustic seal, as in previous embodiments. In some embodiments, inner region 725 includes rubber ridges or ridges of another suitable material that assist in blocking the transmission of sound in either direction.

On the edge 738 of the phone toward the right side is a touch area 730 that, if the wall is flexible enough, may constitute a space that can be touched to toggle the Talk-Lock between the two modes of operation. In other embodiments, touch area 730 may include a physical button. Pushing the button or pressing on that portion of the touch area 730 may in turn depress a phone input prompt that activates the voice assistant. In addition, pressing the touch area 730 may operate to send an electrical pulse via a conductive trace or other contact to the processing system below, which in turn receives the information that the user wishes to toggle between modes. Thus, in some embodiments, the voice assistant can be manually activated and deactivated, much like the embodiments heretofore discussed where one input phrase or clap sequence can activate the VAD and another can deactivate it.

Talk-Lock 700 also includes a microphone (or plurality of microphones, in some embodiments) that (i) acts in a first mode to monitor for a pass phrase while the speakers 740 of the Talk-Lock 700 (positioned adjacent the mobile device's microphone array) provide a continuous interfering audible signal, and (ii) switches the microphone 750 to pass through voice input to the mobile device microphones 710 when the appropriate clap sequence or other phrase is spoken and recognized. In this second mode, the voice assistant can be used for either a single time or a predetermined duration or number of times when one command is provided. Alternatively or additionally the voice assistant can be used indefinitely when another sequence is provided; that is, at least until another deactivating phrase or audible sound is received.

In short, the Talk-Lock device acts much the same for a mobile device 700 as it does for a VAD having an arbitrary shape. In the mobile device case, the VAD is the voice assistant code running on the local processor (or executed code received over a network). As such, the mobile device itself is considered a VAD in this disclosure.

Figure 8:
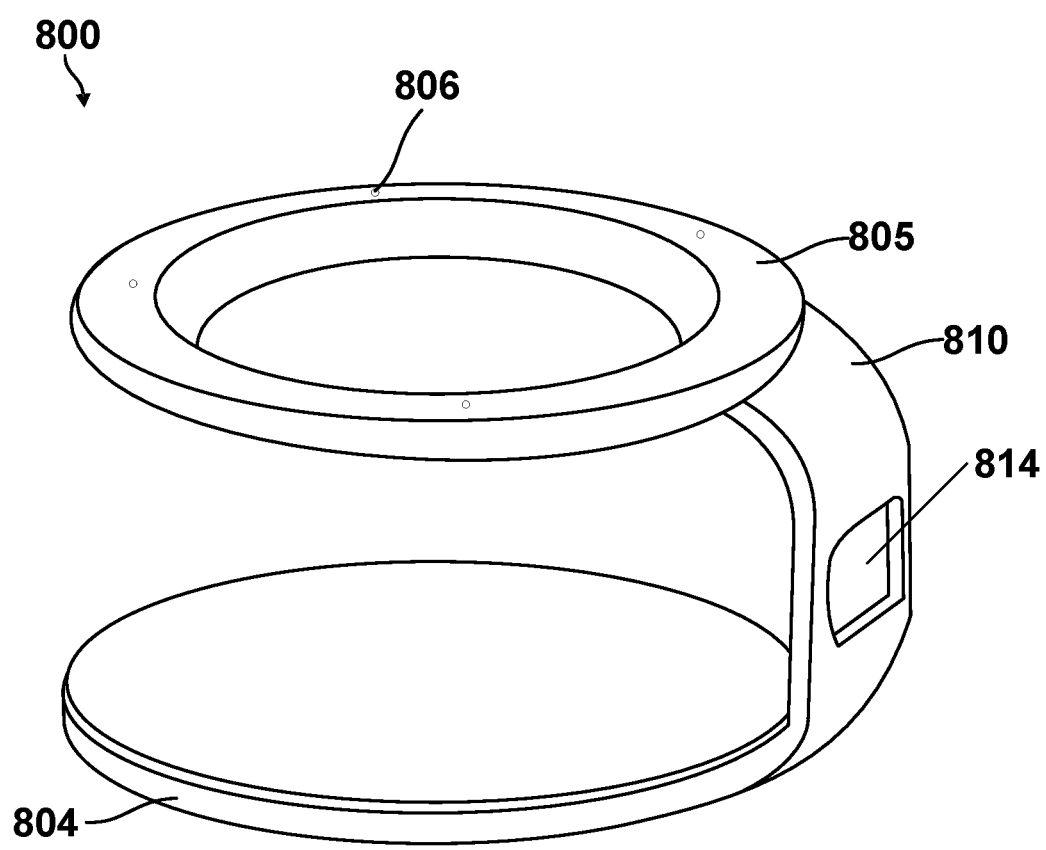
FIG. 8 is a perspective view of a housing of an alternative embodiment of a Talk-Lock apparatus configured for use with a compact VAD.

Since the advent of VADs, ever smaller and more compact models have been distributed. While the challenge to create similarly form-factored Talk-Locks for such VADs has remained, the basic ideas have persisted. To this end, FIG. 8 is a Talk-Lock apparatus 800 that is designed for more recently-distributed, smaller VAD solutions. In this example, Talk-Lock 800 is shaped in part like a coaster to sandwich in a smaller VAD (not shown) than the one described earlier. The exemplary VAD includes four microphones arranged on top closer to the edge, and four control buttons also arranged on top but closer to the center. Therefore, when this VAD is sandwiched between the two layers of Talk-Lock 800, the four microphones can be aligned with four corresponding microphones 806 adjacent the edge of the external surface. Because the user will be able to access the VAD controls by simply reaching in between the circular layout of the top portion of Talk-Lock 800, as before, Talk-Lock 800 does not interfere with or modify the functionality of the VAD.

A difference in the embodiment of FIG. 8 is that, while the microphones are disposed on an upper external surface 805 of the coaster-like Talk-Lock 800 (with the edges of the above structure optionally providing edges to further mute the sound, in addition to rubber ridges surrounding the individual speakers (obscured from view), the main housing 804 is on the portion underneath the anticipated VAD. One advantage of this arrangement is that housing 804 can be made as thick as is necessary to accommodate the processing system. Talk-Lock 800 further includes a member 810 that extends between the upper and lower portions of the housing. An aperture 814 for a power source is also provided in member 810. Care must be taken to provide sufficient room within member 810 to route the microphone and speaker-based signals from the processing system embedded in the lower housing 804 to the upper structure. In some embodiments, the member 810 can be made wider, or thicker, or both, to accommodate sufficient room for low noise conductive pathways between the two portions of the housing of Talk-Lock 800.

The previous description is provided to enable any person skilled in the art to practice the various aspects described herein. Various modifications to these exemplary embodiments presented throughout this disclosure will be readily apparent to those skilled in the art, and the concepts disclosed herein may be applied to other types of structures. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. An apparatus for preventing unintended audible information from passing to a voice-activated assistant device (VAD), comprising:
    a housing configured to form a seal around at least a region including one or more VAD microphones while allowing user access to VAD controls;
    at least one microphone arranged at an exterior surface of the housing;
    one or more speakers arranged at an interior surface of the housing and positioned to align with and oppose the respective one or more VAD microphones; and
    an air-gapped processing system in the housing that operates in a first mode in which the one or more speakers outputs an auditory signal configured to interfere with voice content sourced proximate the VAD, and, upon receiving a designated authorization input via the at least one microphone, that operates in a second mode permitting the voice content to pass via the one or more speakers to the VAD.

2. The apparatus of claim 1, wherein the processing system operates in the second mode for a predetermined time period upon receiving the authorization input, after which the processing system automatedly returns to operating in the first mode.

3. The apparatus of claim 1, wherein in response to a first user input, the processing system operates in the second mode until the processing system receives a second user input.

4. The apparatus of claim 1, wherein the authorization input comprises a clap sequence.

5. The apparatus of claim 4, wherein the clap sequence for changing from the first mode to the second mode and vice versa is identical.

6. The apparatus of claim 1, wherein the authorization input comprises a phrase.

7. The apparatus of claim 1, wherein the one or more speakers output sound comprising jamming frequencies or ranges thereof that obscure coherent interpretation of human voice.

8. The apparatus of claim 7, wherein the output sound comprises a predetermined amplitude sufficient to interfere with interpretation of voice at one or both of a desired volume or distance of a source of the voice from the VAD.

9. The apparatus of claim 1, wherein the housing is configured to form a different seal around each microphone of the one or more VAD microphones.

10. The apparatus of claim 1, wherein the seal is formed along a peripheral portion of the housing comprising the region including the one or more VAD microphones.

11. The apparatus of claim 1, wherein the seal comprises rubber acoustic coupling.

12. The apparatus of claim 1, further comprising a power source arranged to flow along a member of the housing, wherein the power source is obtained from the power supplying the VAD.

13. The apparatus of claim 1, further comprising at least one LED light indicating whether the processing system is operating in the first or second modes.

14. The apparatus of claim 1, wherein the processing system comprises a plurality of air-gapped circuits.

15. An apparatus for controlling a voice-activated assistant device (VAD), comprising:
    a housing comprising an upper member configured to fit over the VAD to form at least a partially acoustically sealed region, the housing comprising one or more internal speakers configured to align with and oppose one or more corresponding VAD microphones in the region, and
    an air-gapped processing system that outputs, in a jamming mode, a jamming auditory input from the one or more internal speakers into the respective one or more VAD microphones to thereby block interpretation by the VAD of external acoustic content.

16. The apparatus of claim 15, wherein, upon receiving an authorization input via a microphone at an external surface of the housing, the processing system operates in a pass-through mode to enable acoustic input to be received by the VAD.

17. The apparatus of claim 16, wherein the authorization input comprises one or more of a clap sequence or a spoken phrase.

18. The apparatus of claim 15, wherein the acoustic jamming signal comprises a frequency spectral component in the human voice range having an amplitude sufficient to interfere with the one or more VAD microphones and thereby disable interpretation of human voice by the VAD.

* * * * *